United States Patent
Lee et al.

(10) Patent No.: US 10,268,621 B2
(45) Date of Patent: Apr. 23, 2019

(54) APPLICATION PROCESSOR AND SEMICONDUCTOR SYSTEM INCLUDING THE SAME

(71) Applicant: Samsung Electronics Co., Ltd., Suwon-si (KR)

(72) Inventors: Sang-Hoon Lee, Hwaseong-si (KR); Byoung-Sul Kim, Suwon-si (KR); Kwang-Hee Lee, Hwaseong-si (KR); Kwan-Yong Jin, Hwaseong-si (KR); Sung-Taek Hong, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 694 days.

(21) Appl. No.: 14/800,701

(22) Filed: Jul. 16, 2015

(65) Prior Publication Data

US 2016/0110131 A1 Apr. 21, 2016

(30) Foreign Application Priority Data

Oct. 16, 2014 (KR) ......................... 10-2014-0139937

(51) Int. Cl.
*G06F 13/40* (2006.01)
*G06F 13/16* (2006.01)

(52) U.S. Cl.
CPC .......... *G06F 13/4068* (2013.01); *G06F 13/16* (2013.01)

(58) Field of Classification Search
CPC ... G06F 11/0742; G06F 11/108; G06F 3/0688
USPC ............................................................ 710/8
See application file for complete search history.

(56) References Cited

U.S. PATENT DOCUMENTS

| | | | |
|---|---|---|---|
| 7,454,557 B2 | 11/2008 | Chang et al. | |
| 7,644,252 B2 | 1/2010 | Kawaguchi | |
| 8,725,955 B2 | 5/2014 | Jeong | |
| 2006/0015947 A1* | 1/2006 | Conti | G06F 12/1433 726/34 |
| 2006/0212734 A1* | 9/2006 | Han | G06F 1/3203 713/320 |

(Continued)

FOREIGN PATENT DOCUMENTS

| | | |
|---|---|---|
| JP | 05-081051 | 4/1993 |
| JP | 2003-323651 | 11/2003 |

(Continued)

*Primary Examiner* — Farley Abad
*Assistant Examiner* — Getente A Yimer
(74) *Attorney, Agent, or Firm* — Muir Patent Law, PLLC

(57) ABSTRACT

Provided are an application processor and a semiconductor system including the same. The semiconductor system includes the application processor, which may include a first register value and of which an operation is controlled by the first register value. The semiconductor system also includes a semiconductor device, which may include a second register value and of which an operation is controlled by the second register value, and a memory storing a third register value that is a copy of the first register value and a fourth register value that is a copy of the second register value. If the stored third register value is changed, the changed third register value is mapped onto the first register value of the processor, and if the fourth register value is changed, the changed fourth register value is mapped onto the second register value.

21 Claims, 17 Drawing Sheets

(56) References Cited

U.S. PATENT DOCUMENTS

| | | | |
|---|---|---|---|
| 2006/0248250 A1* | 11/2006 | Sarkar | G06F 13/364 710/243 |
| 2009/0228737 A1* | 9/2009 | Navon | G06F 9/3001 713/600 |
| 2009/0249030 A1* | 10/2009 | Kwon | G06F 15/167 712/29 |
| 2010/0095089 A1 | 4/2010 | Kon | |
| 2010/0287424 A1 | 11/2010 | Kwon | |
| 2010/0312991 A1* | 12/2010 | Norden | G06F 9/3001 712/205 |
| 2012/0060039 A1* | 3/2012 | Leclercq | G06F 21/10 713/189 |
| 2013/0282951 A1* | 10/2013 | Kuo | G06F 21/575 711/102 |
| 2014/0104935 A1* | 4/2014 | Ware | G11C 7/1012 365/154 |
| 2015/0324196 A1* | 11/2015 | Chen | G06F 9/3012 712/225 |

FOREIGN PATENT DOCUMENTS

| | | |
|---|---|---|
| JP | 2012-181737 | 9/2012 |
| JP | 2013-069054 | 4/2013 |
| KR | 2008-0081479 | 9/2008 |

\* cited by examiner

1400

APPLICATION PROCESSOR AND SEMICONDUCTOR SYSTEM INCLUDING THE SAME

CROSS-REFERENCE TO RELATED APPLICATIONS

This application is based on and claims priority from Korean Patent Application No. 10-2014-0139937, filed on Oct. 16, 2014 in the Korean Intellectual Property Office, the disclosure of which is incorporated herein in its entirety by reference.

BACKGROUND

1. Field of the Invention

The present inventive concept relates to an application processor, and a memory included in a semiconductor system.

2. Description of the Prior Art

An application processor (AP) of a computing system, such as mobile devices, operates through communication with various kinds of semiconductor devices, such as a mobile DRAM, a storage (e.g., eMMC/UFS), a power management IC (PMIC), and a communication device. Various kinds of register values for controlling the various kinds of semiconductor devices are stored in a memory (e.g., ROM and RAM) included in the AP. An operating system (e.g., Windows and Android) may control input/output characteristics of the AP through changing the register values of the memory included in the AP through a specific path. However, the output of the storage (e.g., eMMC/UFS) and the input/output of the PMIC (e.g., power management IC), which are arranged in the periphery of the AP, are unable to be simultaneously controlled by the operating system. Another application programming interface (API) is required to control the various kinds of semiconductor devices.

SUMMARY

The disclosure provides a semiconductor system, including an application processor, which can control input/output operations of various kinds of semiconductor devices.

One exemplary embodiment of the present inventive concept provides a semiconductor system, including a processor with a first register value and a second register value, a memory that may store a third register value, which is a copy of the first register value, and a fourth register value that is a copy of the second register value. The embodiment may include mapping the stored third and fourth register values onto the first register value and the second register value of the processor, respectively. One-to-one mapping between each pair of registers (e.g. first with third and fourth with second) may be provided. If a value of the third register or fourth register is changed, e.g., then the corresponding first or second register of the processor may be changed to the same value. The exemplary embodiment also may include a semiconductor device of which an operation is controlled by the processor. An operation of the processor may be controlled by the third register value via the first register value, and the operation of the semiconductor device may be controlled by the fourth register value via the second register value.

According to another embodiment of the present inventive concept, there is provided a semiconductor system including a processor, which includes a first register value that may control operation of the processor, a semiconductor device, which includes a second register value that may control operation of the semiconductor device, and a memory, which may store a third register value that is a copy of the first register value and store a fourth register value that is a copy of the second register value. If the stored third or fourth register value is changed, the changed third register value is mapped onto the first register value of the processor, and if the fourth register value is changed the fourth register value is mapped onto the second register value of the semiconductor device.

In another embodiment, there is provided an application processor, including an operation unit that may perform an operation, a first storage unit that may store a first register value for controlling an operation of the operation unit, a second storage unit that may store a second register value for controlling an operation of an external semiconductor device, an interface unit that may transmit the first and second register values to the external memory and that may receive a third register value and a fourth register value from the external memory, a mapping unit that may map the third register value onto the first register value in a one-to-one manner and that may map the fourth register value onto the second register value in a one-to-one manner, and a control unit that may control the operation unit using the mapped third register value and that may control the external semiconductor device using the mapped fourth register value.

In another embodiment, the semiconductor system may include a bus connected to a first sub-semiconductor device and a second sub-semiconductor device. The semiconductor system may also include a processor, connected to the bus, which may include a first register value, a first sub-register value, and a second sub-register value. The first sub-register value and the second sub-register value may be stored in memories of the first sub-semiconductor device and the second sub-semiconductor device, respectively. The first register value may be configured to control an operation of the processor, the first sub-register value may be configured to control an operation of the first sub-semiconductor device, and the second sub-register value may be configured to control an operation of the second sub-semiconductor device. The semiconductor system may also include a memory, connected to the bus, and configured to store a third register value that is a copy of the first register value. The memory may also be configured to store a third sub-register value and a fourth sub-register value. The processor may be configured to copy the first and second sub-register values into the third sub-register value and the fourth sub-register value, respectively. The third and fourth sub-register values may be mapped onto the first and second sub-register values, respectively, such that if a device (e.g. an operating system) not connected to the bus adjusts the third register value, third sub-register value, and/or the fourth sub-register value then the operation of the processor, first sub-semiconductor device, and/or the second sub-semiconductor device may be adjusted.

The device that is not connected to the bus (e.g. the operating system) may adjust at least one of an input and output of the first sub-semiconductor device by adjusting the third sub-register value. By adjusting the fourth sub-register value, the device may adjust at least one of an input and output of the second sub-semiconductor device.

DETAILED DESCRIPTION OF THE EMBODIMENTS

Figure 1:
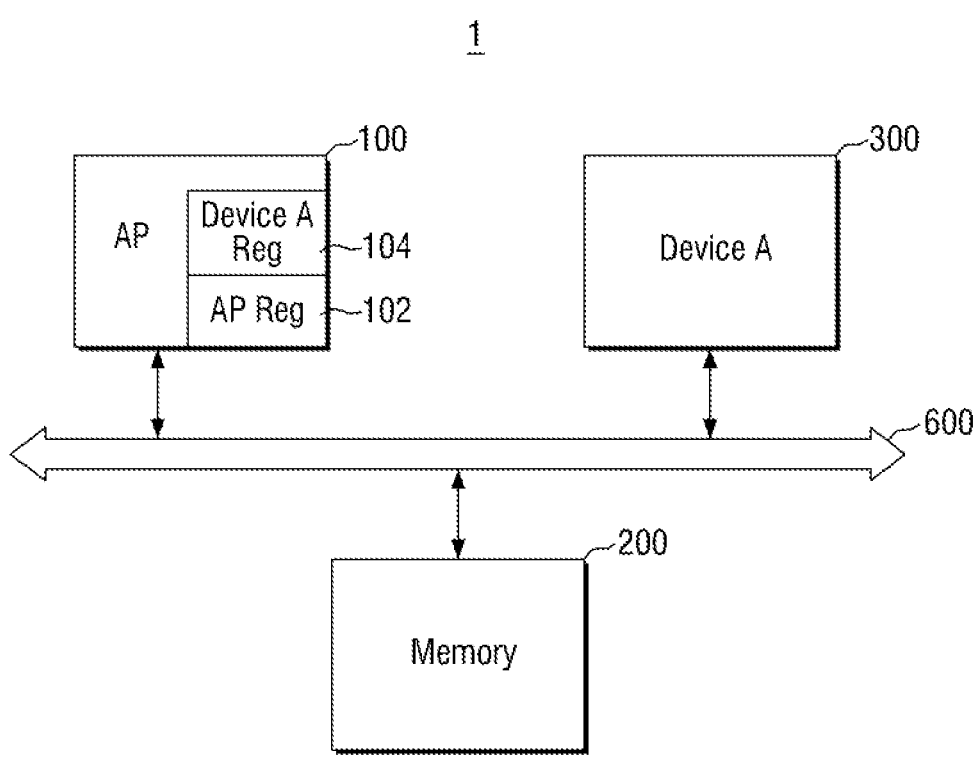
FIG. 1 is a block diagram explaining a semiconductor system according to a first exemplary embodiment of the present inventive concept.

Advantages and features of the present inventive concept and methods of accomplishing the same may be understood more readily by reference to the following detailed description of exemplary embodiments and the accompanying drawings. The present inventive concept may, however, be embodied in many different forms and should not be construed as being limited to the embodiments set forth herein. Rather, these embodiments are provided so that this disclosure will be thorough and to convey the concept of the inventive concept to those skilled in the art, but the present inventive concept will only be defined by the appended claims. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises," "includes," "including," and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. The figures are schematic in nature and their shapes are not intended to limit the scope of the present inventive concept.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, referring to FIGS. 1 to 17, an application processor and a semiconductor system, including the same, according to some exemplary embodiments of the present inventive concept, will be described.

Figure 2:
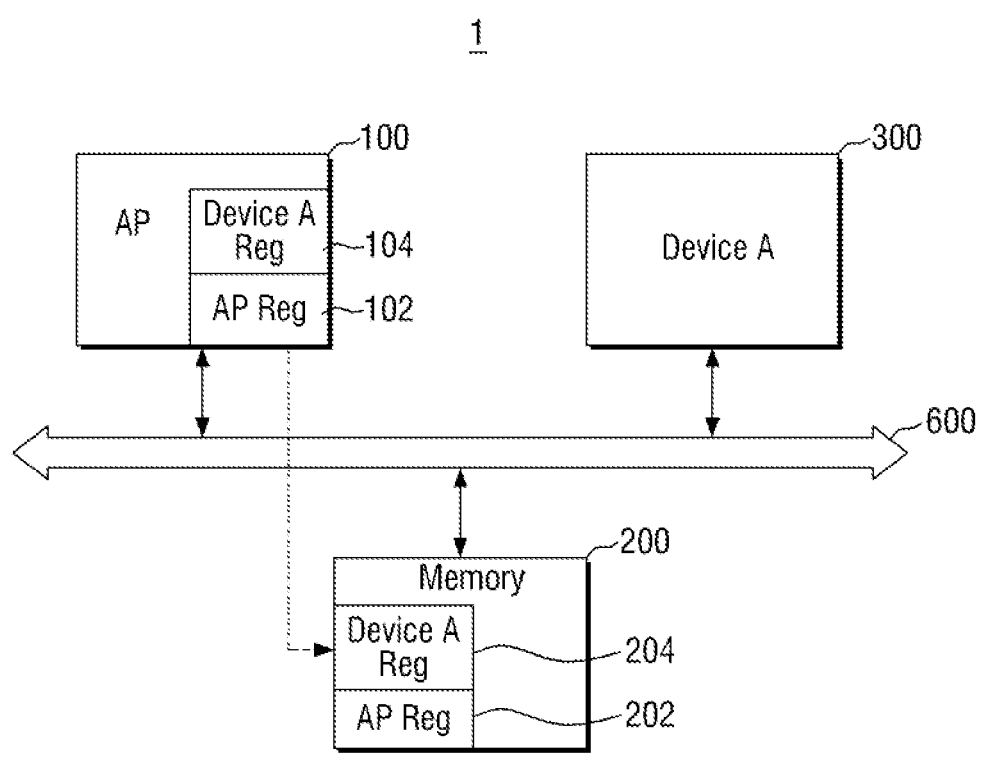
FIGS. 2 and 3 are block diagrams explaining the operation of a semiconductor system according to a first exemplary embodiment of the present inventive concept.
Figure 3:
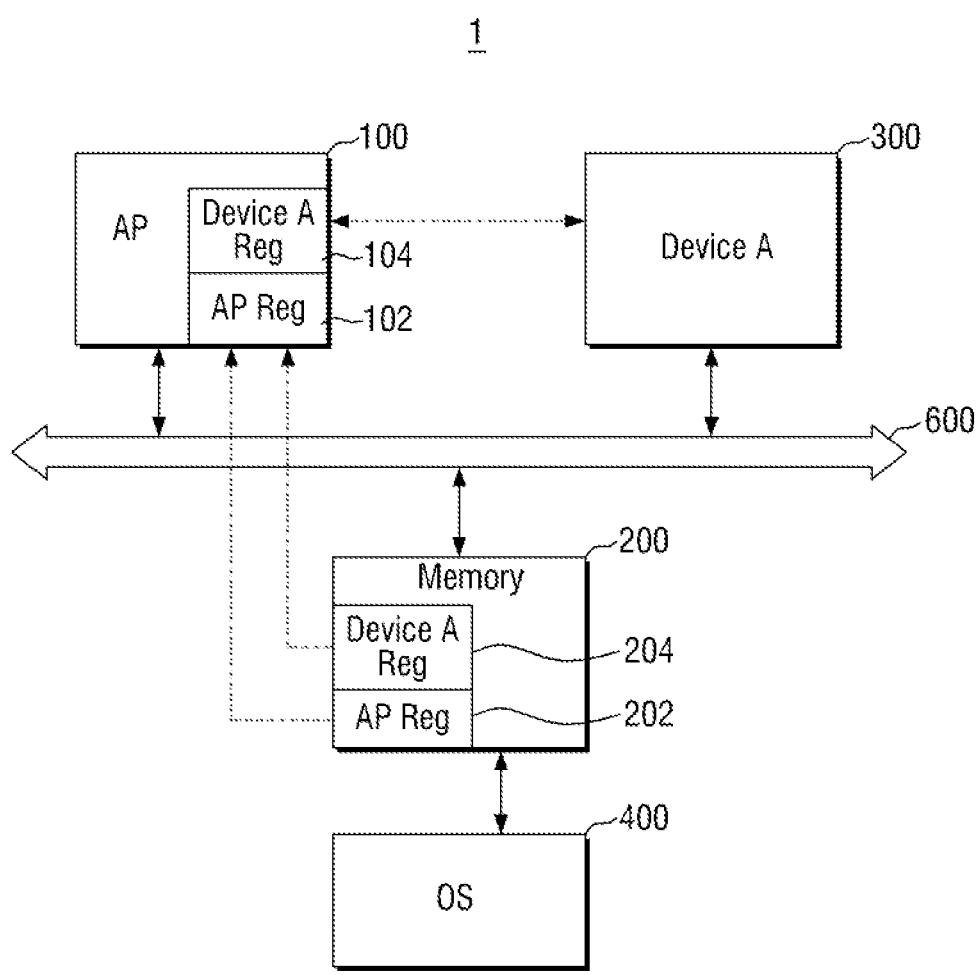

FIG. 1 is a block diagram explaining a semiconductor system according to a first exemplary embodiment of the present inventive concept, and FIGS. 2 and 3 are block diagrams explaining the operation of the semiconductor system according to the first exemplary embodiment of the present inventive concept.

Referring to FIG. 1, a semiconductor system 1 according to the first exemplary embodiment of the present inventive concept includes an application processor (AP) 100, a memory 200, a semiconductor device 300, and a bus 600. Each of the AP 100, the memory 200 and semiconductor device 300 may be separate devices (e.g., not on the same semiconductor chip). For example, each of the AP 100, the memory 200 and semiconductor device 300 may be a semiconductor chip, or embodied in a semiconductor package having one or more semiconductor chips.

The AP 100 may control the entire operation of the semiconductor system 1, and may perform a plurality of logic operations. For example, the AP 100 may be composed of a SoC (System-on-Chip). Although not illustrated in the drawing, the AP 100 may include an operation unit, a cache memory, a memory, and an interface channel. The details thereof will be described later.

The AP 100 may include register values. The register values include data addresses and setting values to control the operation of specific hardware. As the register values for the specific hardware are changed, the operation characteristics of the hardware, for example, an output power, an output frequency, drive strength, a current level, a clock phase value, an output signal, and an input signal of the semiconductor device 300 may be controlled. By changing the register values, operation characteristics of the hardware can be configured in the system and adjusted to a desired performance.

The AP 100 may include a first register value 102 and a second register value 104. The first register value 102 may include a data address and a setting value for controlling its own operation. The second register value 104 may include a data address and a setting value for controlling the operation of another semiconductor device 300 in addition to the AP 100. Although not illustrated in the drawing, the first register value 102 and the second register value 104 may be stored in a memory included in the AP 100. The memory (not illustrated) may correspond to a nonvolatile memory, such as NAND, MRAM, write once ROM, EEPROM, etc. and/or a volatile memory such as SRAM, DRAM, etc. However, the present inventive concept is not limited thereto.

Referring to FIG. 2, the first register value 102 of the AP 100 may be mapped (e.g. copied and linked) onto a third register value 202 in the memory 200, and if the first register value 102 is changed, an input signal and/or an output signal of the AP 100 may be changed. Registers may be mapped together through the bus or through ad hoc data lines. The AP 100 may control an input signal and an output signal of the semiconductor device 300 using the third register value 202. The second register value 104 may be mapped (i.e. copied and linked) onto a fourth register value 204 in the memory 200, and if the fourth register value 204 is changed, the input signal and/or the output signal of the semiconductor device 300 may be changed.

In the case where the mapped third register value 202 or fourth register value 204 is changed, the input signal and/or the output signal of the AP 100 or the semiconductor device 300 may be changed. As described in detail later, the operating system (OS) 400 may control the input signal and the output signal of the AP 100 or the semiconductor device 300 through adjustment of the mapped third register value 202 and fourth register value 204. The OS 400 may be software running on a hardware system (i.e. another processor or host computer) having access to the memory 200.

Referring again to FIG. 1, data that is processed by the AP 100 may be stored in the memory 200. The memory 200 may serve as an operating memory of the AP 100. The first register value 102 and the second register value 104 stored in the AP 100 may be copied into and stored in the memory 200. Specifically, the third register value 202 that is a copy of the first register value 102 and the fourth register value 204 that is a copy of the second register value 104 may be stored in the memory 200. The first/second and the third/fourth registers may be bi-directionally linked with each other. For example, if the third register value 202 stored in the memory 200 is changed, the changed third register value 202 may be mapped onto the first register value 102 of the AP 100, and if the fourth register value 204 stored in the memory 200 is changed, the changed fourth register value 204 may be mapped onto the second register value 104 of the AP 100. An exemplary operation of the memory 200 will be described in detail later.

The memory 200 may include at least one volatile memory, such as a DDR SDRAM (Double Data Rate Static DRAM) and a SDR SDRAM (Single Data Rate) SDRAM, and/or at least one nonvolatile memory, such as an EEPROM (Electrical Erasable Programmable ROM) and a flash memory. Further, the memory 200 may include and/or be embodied by a portable memory that is detachably attached to the semiconductor system 1. The portable memory may include the volatile memory and/or the nonvolatile memory as described above.

For example, the memory 200 may be integrated into one semiconductor device to configure a memory card, such as a PC card (PCMCIA (Personal Computer Memory Card International Association)), a compact flash card (CF), a smart media card (SM, SMC), a memory stick, a multimedia card (MMC, RS-MMC, MMCmicro), an SD card (SD, miniSD, microSD, SDHC), or a UFS (Universal Flash Storage).

The semiconductor device 300 may be a device that provides an output with respect to a specific input. The semiconductor device 300 may include a power control circuit, a memory card, or a communication device. For example, the semiconductor device 300 may include a PMIC (Power Management IC), a UFS (Universal Flash Storage), an eMMC (embedded Multi Media Card), and a modem. However, the present inventive concept is not limited thereto.

The operation of the semiconductor device 300 may be controlled by the second register value 104 that is stored in the AP 100. The second register value 104 may include a data address and a setting value for controlling the operation of the semiconductor device 300. The data address may be an address of a memory location (e.g., a register) of the semiconductor device and the setting value may be a value (e.g., represented by one or more data bits) that is to be stored in the address of the semiconductor device identified by the data address. The second register value 104 may be stored in a memory (not illustrated) included in the semiconductor device 300. The second register value 104 may be changed by changing the fourth register value 204 (e.g., by an operating system 400) due to a mapping relationship between registers 104 and 204. As the second register value 104 is changed, the output signal of the semiconductor device 300 may be changed. For example, as the second register value 104 is changed, an output power, an output frequency, drive strength, a current level, and a clock phase value of the semiconductor device 300 may be adjusted. However, the present inventive concept is not limited thereto. An example operation of the semiconductor device 300 will be described in detail later.

The AP 100, the memory 200, and the semiconductor device 300 may be coupled to each other through the bus 600. The bus 600 corresponds to paths through which data is transferred. Further, the bus 600 may include a protocol to perform data exchange among the AP 100, the memory 200, and the semiconductor device 300. Exemplarily, the AP 100 may be configured to communicate with the semiconductor device 300 through at least one of various interface protocols, such as a USB (Universal Serial Bus) protocol, a MMC (Multi Media Card) protocol, a PCI (Peripheral Component Interconnect) protocol, a PCI-E (PCI-Express) protocol, an ATA (Advanced Technology Attachment) protocol, a serial-ATA protocol, a parallel-ATA protocol, a SCSI (Small Computer System Interface) protocol, an ESDI (Enhanced Small Disk Interface) protocol, and an IDE (Integrated Drive Electronics) protocol. However, the present inventive concept is not limited thereto.

Referring to FIGS. 2 and 3, the AP 100 of the semiconductor system 1 may dump, that is, copy, the first register value 102 and the second register value 104 stored in the AP 100 into the memory 200. Accordingly, the third register value 202 that is a copy of the first register value 102 and the fourth register value 204 that is a copy of the second register value 104 may be stored in the memory 200.

The copied third register value 202 may be mapped onto the first register value 102 that is stored in the AP 100. Accordingly, if the third register value 202 is adjusted, the first register value 102 is also adjusted. This adjustment and similar adjustments and copy operations described herein may be automatic and not involve external commands or other external operations. Thus, the operation of the AP 100 may be controlled according to the setting value of the third register value 202 stored in the memory 200 (e.g., by operating system 400 or some other device). Accordingly, the operating system 400 may control the operation of the AP 100 through adjustment of the third register value 202 and may set a desired or optimized input or output.

In the same manner, the copied fourth register value 204 may be mapped onto the second register value 104 that is stored in the AP 100. Accordingly, if the fourth register value 204 is adjusted, the second register value 140 is also adjusted. Thus, the operation of the semiconductor device 300 may be controlled according to the setting value of the fourth register value 204 that is stored in the memory 200 (e.g., by the operating system 400 or some other device). Accordingly, the operating system 400 or the AP 100 may control the operation of the semiconductor device 300 through adjustment of the fourth register value 204 and may set the optimized input or output.

As a result, the operating system 400 may control the AP 100 and the semiconductor device 300 to perform a desired or optimized operation such as that desired by a user using the first register value 102 of the AP 100 and the second register value 104 of the semiconductor device 300, respectively, via the third and fourth registers 202 and 204, which are mapped to the AP 100. Through this configuration of the semiconductor system 1 it becomes possible to improve an existing system in which an operating system is unable to directly access the semiconductor device 300 by allowing a multi-access operation to be performed. Further, since simultaneous control of the input/output characteristics of all the components can be easily performed by the same operating system 400, the semiconductor system 1 can be optimized (e.g. in terms of efficient use of hardware resources, shorter delay between user-desired adjustment and execution of the adjustment, and freedom of configurability) even without providing any additional component for storing the register values in the semiconductor system 1.

As the memory 200 in which the first register value 102 and the second register value 104 are dumped, not only a volatile memory but also a nonvolatile memory may be used. Further, the register values of all the components, of which the input/output can be controlled during booting of the semiconductor system 1, may be dumped into a detachable portable memory (e.g. memory 200) to control and change the register values in the same operating system 400. The portable memory may be used in a boundary scan/test. The portable memory may be removed after completion of the boundary scan/test. Further, the semiconductor system 1 may test the lifespan of a power supply of the portable memory through control of a power switch of the portable memory. The portable memory may include a volatile memory or a nonvolatile memory.

Figure 4:
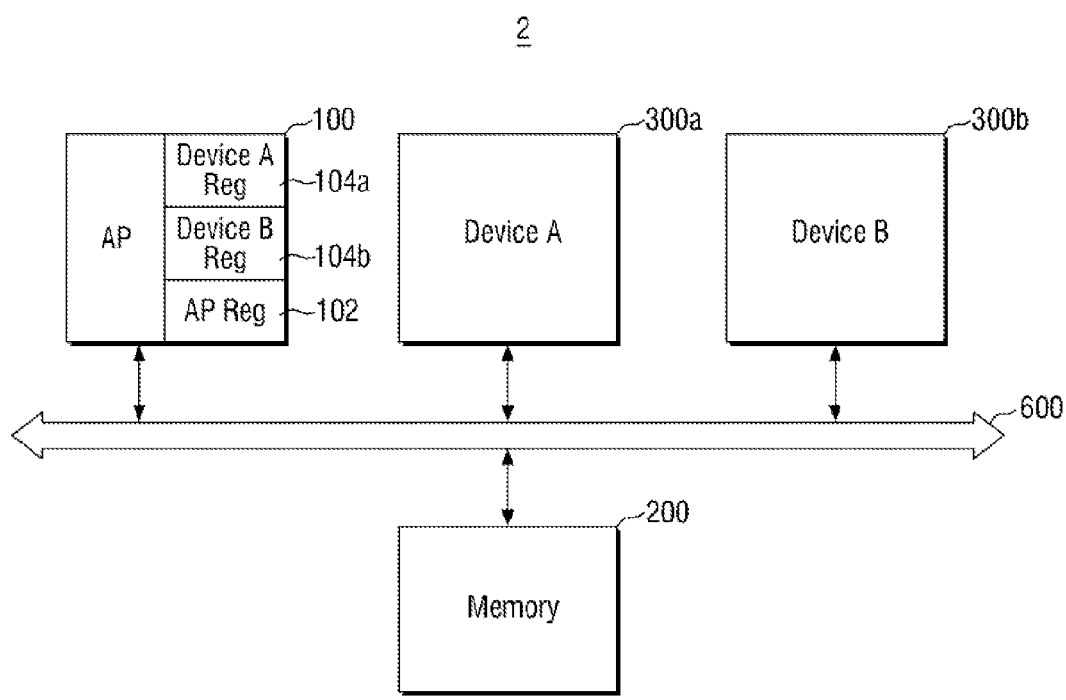
FIG. 4 is a block diagram explaining a semiconductor system according to a second exemplary embodiment of the present inventive concept.
Figure 5:
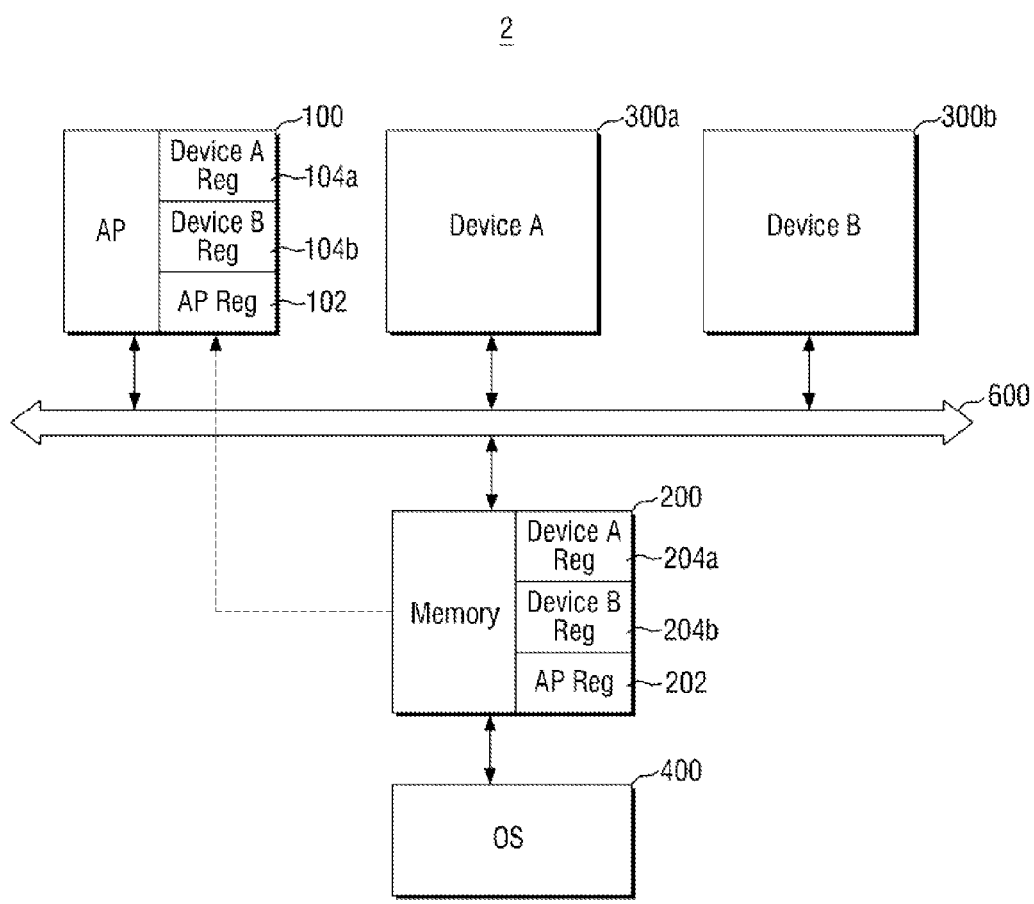
FIG. 5 is a block diagram explaining the operation of a semiconductor system according to a second exemplary embodiment of the present inventive concept.

FIG. 4 is a block diagram explaining a semiconductor system according to a second exemplary embodiment of the present inventive concept, and FIG. 5 is a block diagram explaining the operation of the semiconductor system according to the second exemplary embodiment of the present inventive concept. Hereinafter, for convenience in explanation, duplicate explanation of the same items as those according to the above-described exemplary embodiment may be omitted, and the explanation will be made regarding differences between this exemplary embodiment and the above-described exemplary embodiment.

Referring to FIG. 4, a semiconductor system 2 according to the second exemplary embodiment of the present inventive concept may operate in substantially the same manner as the semiconductor system 1 according to the first exemplary embodiment of the present inventive concept as described above with reference to FIGS. 1 to 3.

The semiconductor system 2 according to the second exemplary embodiment of the present inventive concept includes an application processor (AP) 100, a memory 200, a first sub-semiconductor device 300a, a second sub-semiconductor device 300b, and a bus 600. The application processor (AP) 100, a memory 200, a first sub-semiconductor device 300a, a second sub-semiconductor device 300b may be embodied by semiconductor chips and/or semiconductor packages with one or more semiconductor chips, e.g.

The AP 100 may include register values. Specifically, the AP 100 may include a first register value 102 that includes a data address for controlling its own operation, a first sub-register value 104a that includes a data address and a corresponding setting value for controlling the operation of the first sub-semiconductor device 300a, and a second sub-register value 104b that includes a data address and a corresponding setting value for controlling the operation of the second sub-semiconductor device 300b. Each data address may be an address of a memory location (e.g., a register) of the corresponding semiconductor device and the corresponding setting value may be a value (e.g., represented by one or more data bits) that is to be stored in the address of the corresponding semiconductor device identified by the corresponding data address. The first register value 102, the first sub-register value 104a, and the second sub-register value 104b may be stored in a memory (not illustrated) included in the AP 100.

Data that is processed by the AP 100 may be stored in the memory 200. The memory 200 may serve as an operating memory of the AP 100. The first register value 102, the first sub-register value 104a, and the second sub-register value 104b stored in the AP 100 may be copied into and stored in the memory 200.

At least one of the first sub-semiconductor device 300a and the second sub-semiconductor device 300b is a device that provides an output with respect to a specific input (e.g. with respect to the first sub-register value 104a, and the second sub-register value 104b). The first sub-semiconductor device 300a and/or the second sub-semiconductor device 300b may include a power control circuit, a memory card, or a communication device. For example, the first sub-semiconductor device 300a or the second sub-semiconductor device 300b may include a PMIC (Power Management IC), a UFS (Universal Flash Storage), an eMMC (embedded Multi Media Card), and a modem. However, the present inventive concept is not limited thereto.

The operation of the first sub-semiconductor device 300a may be controlled by the first sub-register value 104a that is stored in the AP 100. The first sub-register value 104a may include a data address and a setting value for controlling the operation of the first sub-semiconductor device 300a. The first sub-register value 104a may be stored even in a memory included in the first sub-semiconductor device 300a. As the first sub-register value 104a is changed, the input/output of the first sub-semiconductor device 300a may be changed. Specifically, if the setting value corresponding to the data address that is included in the first sub-register value 104a is changed, the input/output of the first sub-semiconductor device 300a may be changed. For example, as the setting value is changed, an output power, an output frequency, drive strength, a current level, and a clock phase value of the first sub-semiconductor device 300a may be adjusted.

In the same manner, the operation of the second sub-semiconductor device 300b may be controlled by the second sub-register value 104b that is stored in the AP 100. The second sub-register value 104b may include a data address and a setting value for controlling the operation of the second sub-semiconductor device 300b. The second sub-register value 104b may be stored even in a memory included in the second sub-semiconductor device 300b. As the second sub-register value 104b is changed, the input/output of the second sub-semiconductor device 300b may be changed. Specifically, if the setting value corresponds to the data address that is included in the second sub-register value 104b is changed, the input/output of the second sub-semiconductor device 300b may be changed. For example, as the setting value is changed, an output power, an output frequency, drive strength, a current level, and a clock phase value of the second sub-semiconductor device 300b may be adjusted.

The AP 100, the memory 200, the first sub-semiconductor device 300a, and the second sub-semiconductor device 300b may be coupled to each other through the bus 600. The bus 600 corresponds to paths through which data is transferred, and data may be exchanged among the AP 100, the memory 200, the first sub-semiconductor device 300a, and the second sub-semiconductor device 300b.

Referring to FIG. 5, the AP 100 of the semiconductor system 2 may dump the first register value 102, the first sub-register value 104a, and the second sub-register value 104b, which are stored in the AP 100, into the memory 200. Accordingly, the third register value 202 that is a copy of the first register value 102, a third sub-register value 204a that is a copy of the first sub-register value 104a, and the fourth sub-register value 204b that is a copy of the second sub-register value 104b may be stored in the memory 200.

The copied third register value 202 may be mapped onto the first register value 102 that is stored in the AP 100. Accordingly, if the third register value 202 is adjusted, the first register value 102 is also adjusted. Further, the operation of the AP 100 may be controlled according to the setting value of the third register value 202 stored in the memory 200. Accordingly, the operating system 400 may control the operation of the AP 100 through adjustment of the third register value 202 and may set the optimized input or output.

In the same manner, the copied third sub-register value 204a may be mapped onto the first sub-register value 104a that is stored in the AP 100. Accordingly, if the third sub-register value 204a is adjusted, the first sub-register value 104a is also adjusted. Further, the operation of the first sub-semiconductor device 300a may be controlled according to the setting value of the third sub-register value 204a stored in the memory 200. Accordingly, the operating system 400 and the AP 100 may control the operation of the first sub-semiconductor device 300a through adjustment of the third sub-register value 204a and may set the optimized input or output.

Further, the copied fourth sub-register value 204b may be mapped onto the second sub-register value 104b that is stored in the AP 100. Accordingly, if the fourth sub-register value 204b is adjusted, the second sub-register value 204b would also be adjusted. Further, the operation of the second sub-semiconductor device 300b may be controlled according to the setting value of the fourth sub-register value 204b that is stored in the memory 200. Accordingly, the operating system 400 and the AP 100 may control the operation of the second sub-semiconductor device 300b through adjustment of the fourth sub-register value 204b and may set the optimized input or output.

The operating system (OS) 400 may adjust the third sub-register value 204a and the fourth sub-register value 204b stored in the memory 200, and the adjusted register values are mapped onto the first sub-register value 104a and the second sub-register value 104b, respectively, of the AP 100. The AP 100 may control the input/output of the first sub-semiconductor device 300a and the second sub-semiconductor device 300b using the mapped register values.

Through this configuration of the semiconductor system 2, the operating system 400 may perform a multi-access operation with respect to the AP 100, the first sub-semiconductor device 300a, and the second sub-semiconductor device 300b. For example, the OS 400 may control an output of the AP 100 and sub-semiconductor device 300a while the AP 100 controls an output of the second sub-semiconductor device 300b. The opposite is also possible, i.e. the OS 400 may control 300b while the AP 100 controls 300a. Further, since simultaneous control of the input/output characteristics of all the components can be easily performed by the same operating system 400, the semiconductor system 2 can be optimized even without providing any additional component for storing the register values in the semiconductor system 2.

Figure 6:
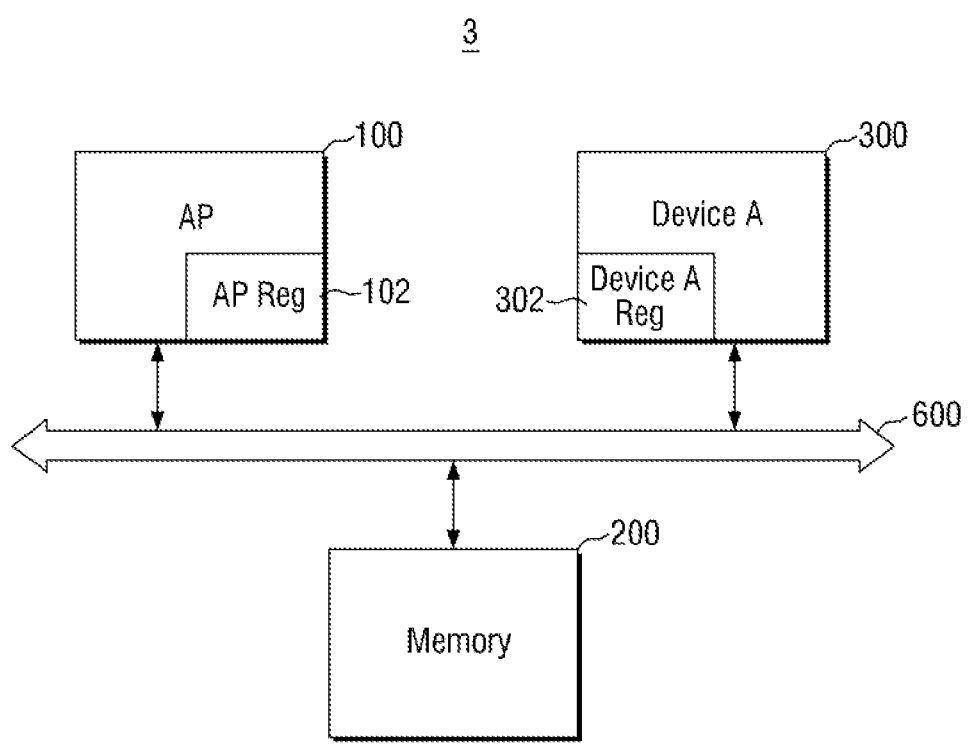
FIG. 6 is a block diagram explaining a semiconductor system according to a third exemplary embodiment of the present inventive concept.
Figure 7:
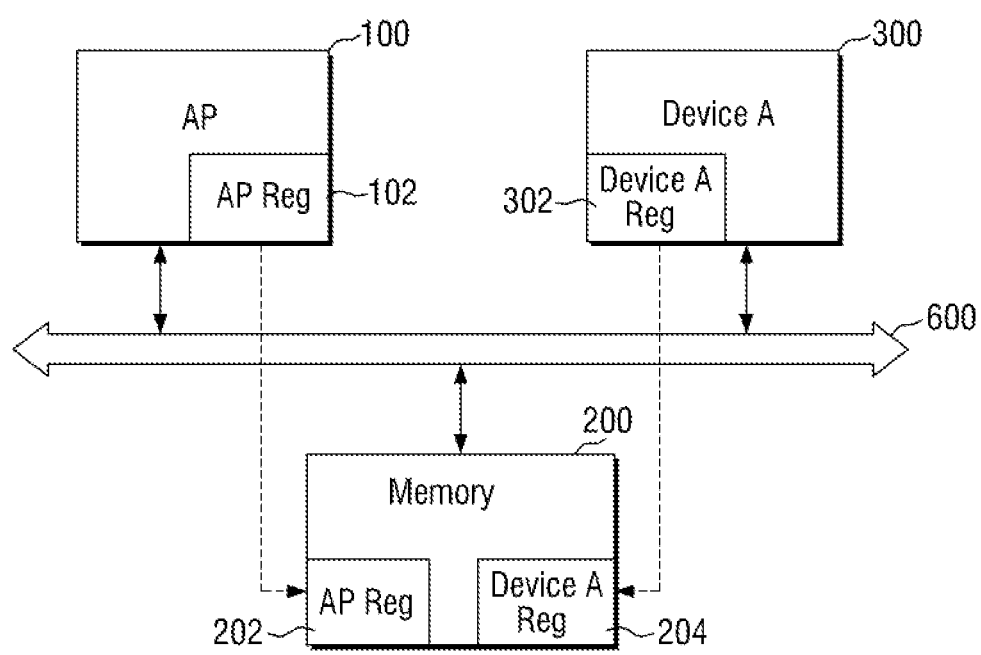
FIGS. 7 and 8 are block diagrams explaining the operation of a semiconductor system according to a third exemplary embodiment of the present inventive concept.
Figure 8:
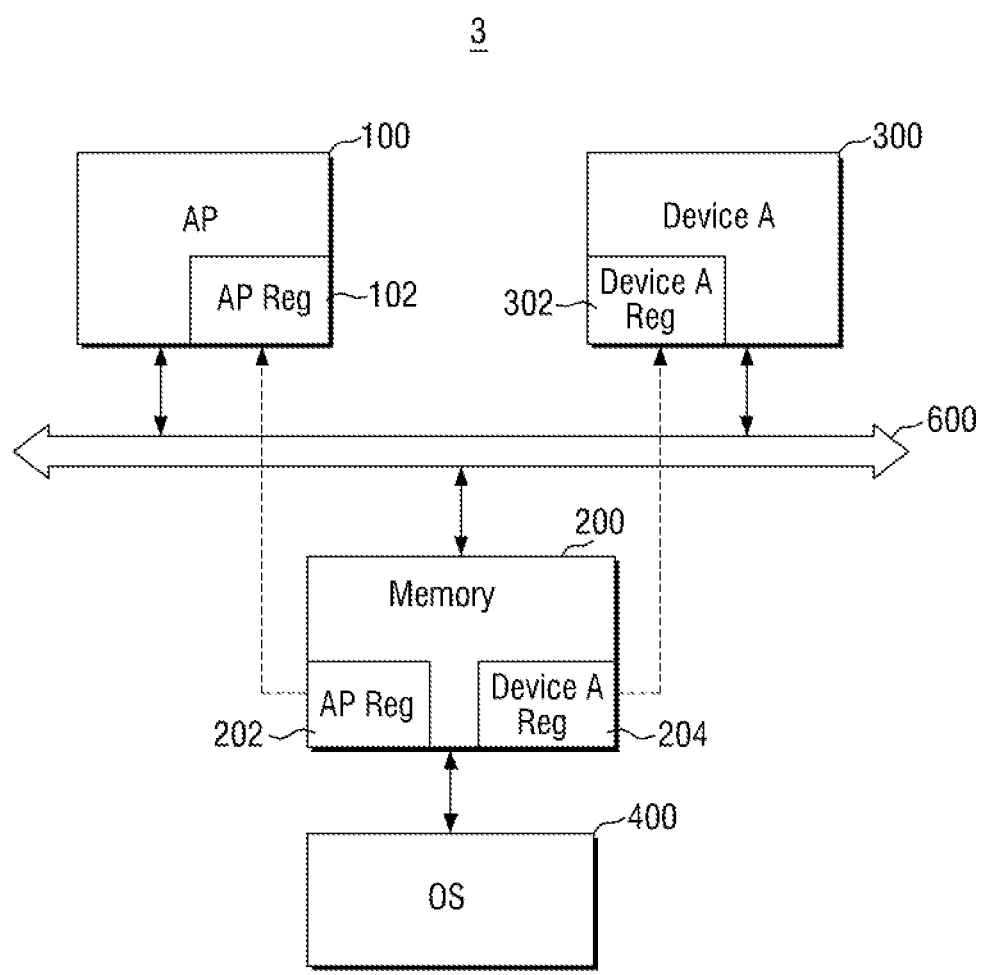

FIG. 6 is a block diagram explaining a semiconductor system according to a third exemplary embodiment of the present inventive concept, and FIGS. 7 and 8 are block diagrams explaining the operation of the semiconductor system according to the third exemplary embodiment of the present inventive concept. Hereinafter, for convenience in explanation, duplicate explanation of the same items as those according to the above-described exemplary embodiments may be omitted, and the explanation will be on differences between this exemplary embodiment and the above-described exemplary embodiments.

Referring to FIG. 6, a semiconductor system 3 according to the third exemplary embodiment of the present inventive concept includes an application processor (AP) 100, a memory 200, a semiconductor device 300, and a bus 600.

The AP 100 may include only a first register value 102 for controlling its own operation. The first register value 102 may include an address and a setting value for controlling the operation of the AP 100. Although not illustrated in the drawing, the first register value 102 may be stored in a memory included in the AP 100. The memory in the AP 100 (not illustrated) or the memory 200 may correspond to a nonvolatile memory, such as NAND, MRAM, PRAM, EEPROM, write once ROM, etc. and/or volatile memory such as SRAM, DRAM, etc. However, the present inventive concept is not limited thereto.

The first register value 102 of the AP 100 may be mapped onto a third register value 202 that is copied into the memory 200, and if the first register value 102 is changed, an input signal and/or an output signal of the AP 100 may be changed.

The semiconductor device 300 is a device that provides an output with respect to a specific input. The semiconductor device 300 may include a second register value 302 for controlling its own operation. The second register value 302 may include an address and a setting value for controlling the operation of the semiconductor device 300. Where the second register value 302 is changed the output signal of the semiconductor device 300 may be changed. For example, as the second register value 302 is changed, an output power, an output frequency, drive strength, a current level, and a clock phase value of the semiconductor device 300 may be adjusted. However, the present inventive concept is not limited thereto.

Although not illustrated in the drawing, the second register value 302 may be stored in a memory included in the semiconductor device 300. The memory (not illustrated) may correspond to a nonvolatile memory, such as NAND, MRAM, PRAM, EEPROM, write once ROM, etc. and/or volatile memory such as SRAM, DRAM, etc. However, the present inventive concept is not limited thereto.

The semiconductor device 300 may include a power control circuit, a memory card, or a communication device. For example, the semiconductor device 300 may include a PMIC (Power Management IC), a UFS (Universal Flash Storage), an eMMC (embedded Multi Media Card), and a modem. However, the present inventive concept is not limited thereto.

Data that is processed by the AP 100 or the semiconductor device 300 may be stored in the memory 200. The memory 200 may serve as an operating memory for the AP 100 or the semiconductor device 300.

The AP 100, the memory 200, and the semiconductor device 300 may be coupled to each other through the bus 600. The bus 600 corresponds to paths through which data is transferred. Further, the bus 600 may include a protocol to perform data exchange among the AP 100, the memory 200, and the semiconductor device 300.

Referring to FIGS. 7 and 8, the first register value 102 that is stored in the AP 100 and the second register value 302 stored in the semiconductor device 300 may be copied into and stored in the memory 200. Specifically, the third register value 202 that is a copy of the first register value 102 and the fourth register value 204 that is a copy of the second register value 302 may be stored in the memory 200. If the third register value 202 stored in the memory 200 is changed, the changed third register value 202 may be mapped onto the first register value 102 of the AP 100. If the fourth register value 204 is changed, the changed fourth register value 204 may be mapped onto the second register value 302 of the semiconductor device 300.

The operation of the AP 100 may be controlled by the first register value 102, and the operation of the semiconductor device 300 may be controlled by the second register value 302. Accordingly, if the copied third register value 202 or fourth register value 204 is changed, the changed third register value 202 may be mapped onto the first register value 102 of the AP 100, or the changed fourth register value 204 may be mapped onto the second register value 302 of the semiconductor device 300 to change the first register value 102 and the second register value 302. The inputs/outputs of the AP 100 and the semiconductor device 300 may be changed together to match the changed first register value 102 and second register value 302. The operating system 400 may control the inputs/outputs of the AP 100 and the semiconductor device 300 through changing the third register value 202 and the fourth register value 204, respectively, which are stored in the memory 200.

As a result, the operating system 400 according to the present inventive concept may control the AP 100 or the semiconductor device 300 to perform the optimized operation that a user desires using the first register value 102 of the AP 100 and the second register value 302 of the semiconductor device 300, respectively, which are stored in the memory 200. Through this configuration of the semiconductor system 3 it becomes possible to improve an existing system in which an operating system is unable to directly access the semiconductor device 300 by allowing a multi-access operation to be performed. Further, since simultaneous control of the input/output characteristics of all the components can be easily performed by the same operating system 400, the semiconductor system 3 can be optimized.

As the memory 200 in which the first register value 102 and the second register value 302 are dumped, not only a volatile memory but also a nonvolatile memory may be used. Further, the register values of all the components, of which the input/output can be controlled during booting of the semiconductor system 3, may be dumped into a detachable portable memory (e.g. memory 200) to control and change the register values in the same operating system 400. The portable memory may be used in a boundary scan/test. The portable memory may be removed after completion of the boundary scan/test. Further, the semiconductor system 3 may test the lifespan of a power supply of the portable memory through control of a power switch of the portable memory. The portable memory may include a volatile memory or a nonvolatile memory.

Figure 9:
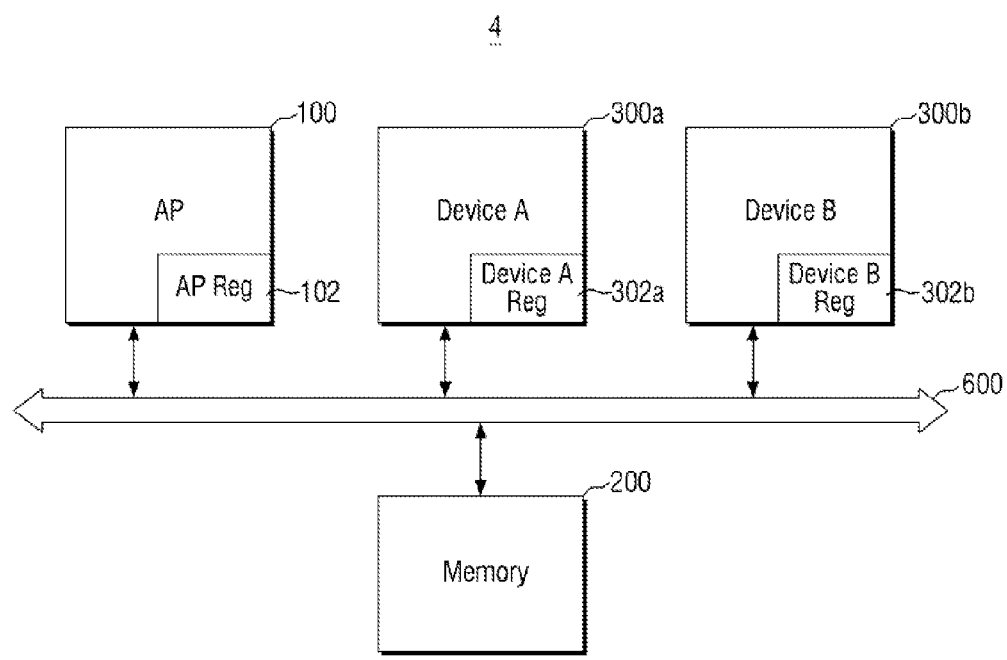
FIG. 9 is a block diagram explaining a semiconductor system according to a fourth exemplary embodiment of the present inventive concept.
Figure 10:
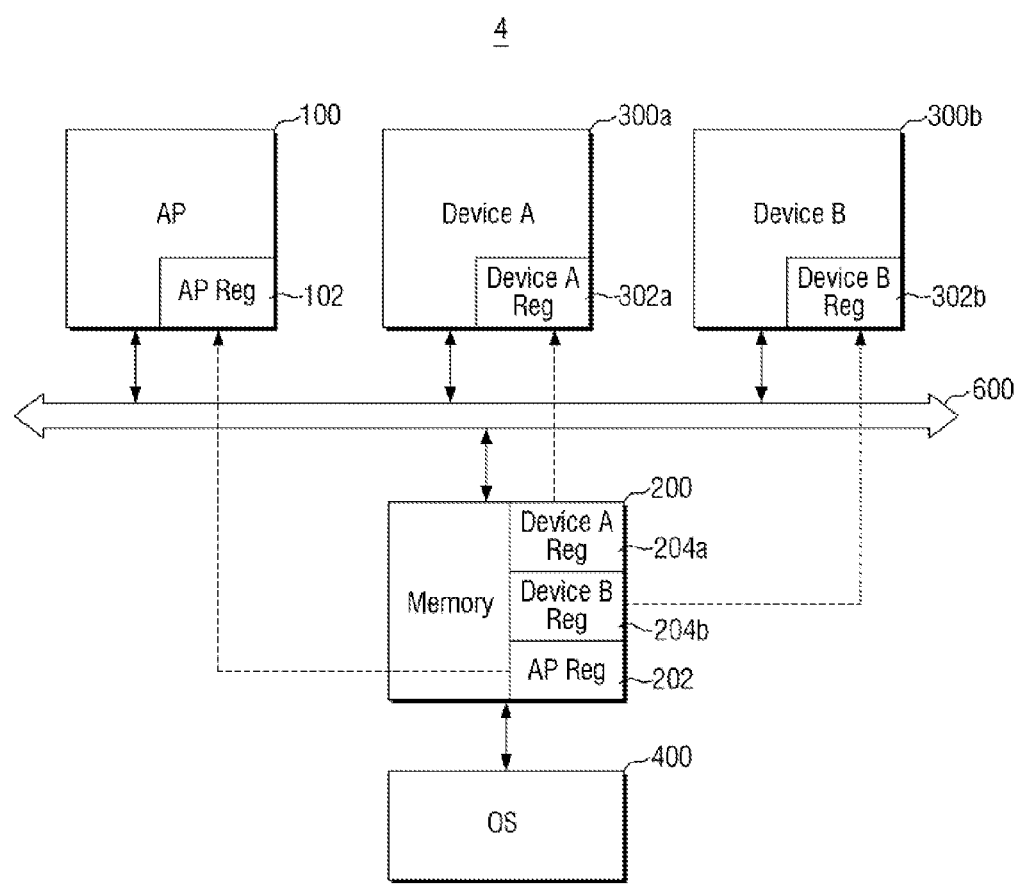
FIG. 10 is a block diagram explaining the operation of a semiconductor system according to a fourth exemplary embodiment of the present inventive concept.

FIG. 9 is a block diagram explaining a semiconductor system according to a fourth exemplary embodiment of the present inventive concept, and FIG. 10 is a block diagram explaining the operation of the semiconductor system according to the fourth exemplary embodiment of the present inventive concept. Hereinafter, for convenience in explanation, duplicate explanation of the same items as those according to the above-described exemplary embodiments will be omitted, and the explanation will be made regarding differences between this exemplary embodiment and the above-described exemplary embodiments.

Referring to FIG. 9, a semiconductor system 4, according to the fourth exemplary embodiment of the present inventive concept, may operate in substantially the same manner as the semiconductor system 3, according to the third exemplary embodiment of the present inventive concept as described above with reference to FIGS. 6 to 8.

The semiconductor system 4 includes an application processor (AP) 100, a memory 200, a first sub-semiconductor device 300a, a second sub-semiconductor device 300b, and a bus 600.

The AP 100 may include register values. Specifically, the AP 100 may include a first register value 102 that includes a data address and a setting value for controlling its own operation. Although not illustrated in the drawing, the first register value 102 may be stored in a memory (not illustrated) included in the AP 100.

The first sub-semiconductor device 300a may include a first sub-register value 302a including a data address and a setting value for controlling its own operation. In the same manner, the second sub-semiconductor device 300b may include a second sub-register value 302b including a data address and a setting value for controlling its own operation. The first sub-register value 302a and the second sub-register value 302b may be stored in a memory (not illustrated) of the first sub-semiconductor device 300a and a memory (not illustrated) of the second sub-semiconductor device 300b, respectively.

The first register value 102 stored in the AP 100, the first sub-register value 302a stored in the first sub-semiconductor device 300a, and the second sub-register value 302b stored in the second sub-semiconductor device 300b may be copied into and stored in the memory 200. Specifically, in the memory 200, a third register value 202 that is a copy of the first register value 102, a third sub-register value 204a that is a copy of the first sub-register value 302a, and a fourth sub-register value 204b that is a copy of the second sub-register value 302b may be stored. If the stored third register value 202, third sub-register value 204a, or fourth sub-register value 204b is changed, the changed third register value 202 would be mapped onto the first register value 102 of the AP 100. If the stored third sub-register value 204a is changed, the changed third sub-register value 204a would be mapped onto the first sub-register value 302a of the first semiconductor device 300a. If the fourth sub-register value 204b is changed, the changed fourth sub-register value 204b would be mapped onto the second sub-register value 302b of the second semiconductor device 300b.

The operation of the AP 100 may be controlled by the first register value 102. The operation of the first sub-semiconductor device 300a may be controlled by the first sub-resister value 302a, and the operation of the second sub-semiconductor device 300b may be controlled by the second sub-register value 302b.

If the copied third sub-register value 204a or fourth sub-register value 204b is changed, the changed third sub-register value 204a may be mapped onto the first sub-register value 302a of the first sub-semiconductor device 300a, or the changed fourth sub-register value 204b may be mapped onto the second sub-register value 302b of the second sub-semiconductor device 300b. Changes in the values of the 204a and 204b sub-registers cause automatic changes to the first sub-register value 302a and the second sub-register value 302b, respectively. The inputs/outputs of the first sub-semiconductor device 300a and the second sub-semiconductor device 300b may be changed together to match the changed first sub-register value 302a and second sub-register value 302b.

The operating system 400 may control the inputs/outputs of the first sub-semiconductor device 300a and the second sub-semiconductor device 300b through changing the third sub-register value 204a or the fourth sub-register value 204b stored in the memory 200. In multi-access fashion, the OS 400 may also simultaneously control the inputs/outputs of the AP 100 while controlling either or both of the sub-registers 204a and 204b.

Figure 11:
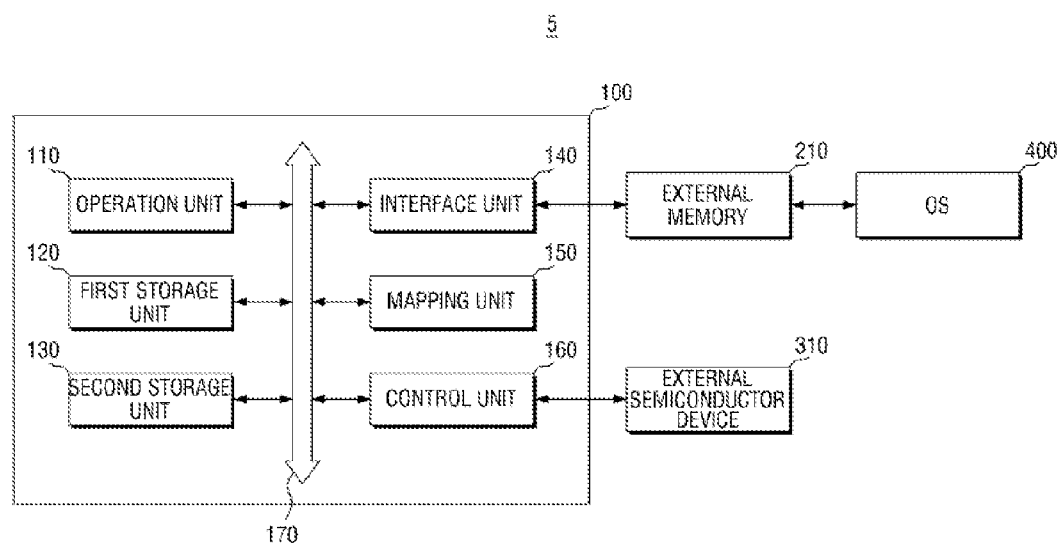
FIG. 11 is a block diagram explaining the operation of a semiconductor system according to some exemplary embodiments of the present inventive concept.

FIG. 11 is a block diagram explaining the operation of a semiconductor system according to some exemplary embodiments of the present inventive concept. Hereinafter, for convenience in explanation, duplicate explanation of the same items as those according to the above-described exemplary embodiments will be omitted, and the explanation will be made regarding differences between this exemplary embodiment and the above-described exemplary embodiments.

Referring to FIG. 11, a semiconductor system 5 according to some exemplary embodiments of the present inventive concept includes an application processor (AP) 100, an external memory 210, an external semiconductor device 310, and an operating system 400.

The external memory 210 and the external semiconductor device 310 are substantially the same as the memory 200 and the semiconductor device 300, respectively, as described above.

The AP 100 may include an operation unit 110, a first storage unit 120, a second storage unit 130, an interface unit 140, a mapping unit 150, a control unit 160, and a bus 170.

The operation unit 110 may perform an operation that is required to drive the AP 100. In some exemplary embodiments of the present inventive concept, the operation unit 110 may be configured in a multi-core environment including a plurality of cores. However, the present inventive concept is not limited thereto.

A first register value 102 (not shown) for controlling the operation of the operation unit 110 may be stored in the first storage unit 120. The first register value 102 may include a data address and a setting value for controlling the operation of the AP 100 itself.

A second register value 104 (not shown) for controlling the operation of the external semiconductor device 310 may be stored in the second storage unit 130. The second register value 104 may include a data address and a setting value for controlling the operation of the external semiconductor device 310. The second register value 104 may include an output power, an output frequency, drive strength, a current level, and a clock phase value. However, the present inventive concept is not limited thereto.

The interface unit 140 may transmit the first register value 102 and the second register value 104 to the external memory 210, and may receive a third register value 202 (not shown) or a fourth register value 204 (not shown) from the external memory 210. The third register value 202 or the fourth register value 204 may be stored in the memory 210 and then changed by the operating system 400. The changed third and fourth register values 202 and 204 may be received in real time through the interface unit 140 into the AP 100.

The mapping unit 150 may map the third register value 202 onto the first register value 102 in a one-to-one manner, and may map the fourth register value 204 onto the second register value 104 in a one-to-one manner. The third register value 202 and the fourth register value 204 may be stored in the external memory 210, and if the third register value 202 or the fourth register value 204 is changed, the changed value may be reflected in the first register value 102 or the second register value 104, respectively.

The control unit 160 may control the operation unit 110 using the first register value 102 stored in the AP 100, and it may control the external semiconductor device 310 using the second register value 104 stored in the AP 100. The OS 400 according to the present inventive concept may control the AP 100 and the external semiconductor device 310 to perform the optimized operation that a user desires using the mapped third register value 202 and the mapped fourth register value 204, respectively.

Figure 12:
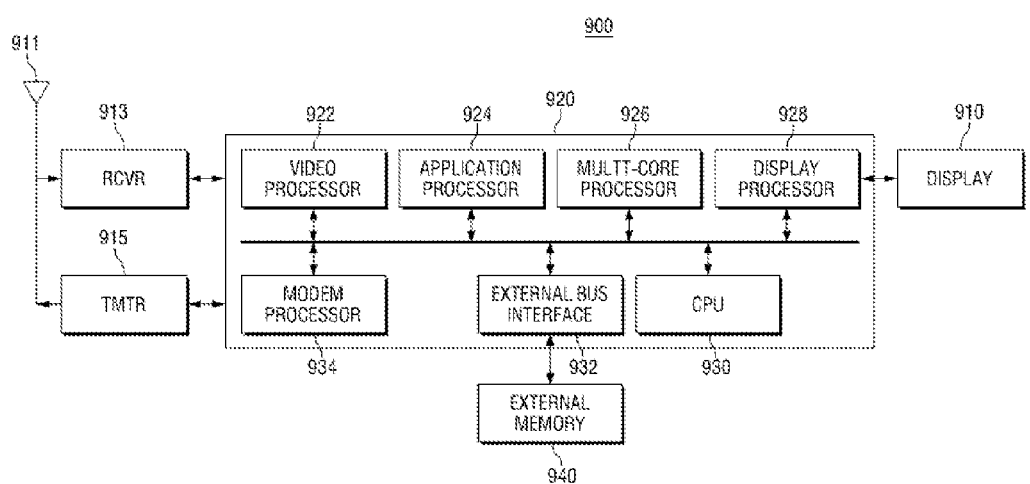
FIG. 12 is a block diagram illustrating a wireless communication device including a semiconductor system according to exemplary embodiments of the present inventive concept.

FIG. 12 is a block diagram illustrating a wireless communication device that includes at least one of the semiconductor systems 1 to 5 according to exemplary embodiments of the present inventive concept.

Referring to FIG. 12, the wireless communication device 900 may be a cellular phone, a smart phone terminal, a handset, a personal digital assistant (PDA), a laptop computer, a video game unit, or another device. The device 900 may use code division multiple access (CDMA), time division multiple access (TDMA), such as a global system GSM for mobile communication, or other wireless communication standards.

The device 900 may provide bi-directional communication through a reception path and a transmission path. Signals transmitted by one or more base stations on the reception path may be received through an antenna 911 and may be provided to a receiver (RCVR) 913. The receiver 913 may perform conditioning and digitalization of a received signal and provide samples to a digital section 920 for additional processing. On the transmission path, a transmitter (TMTR) 915 may receive data transmitted from the digital section 920, perform processing and conditioning of the data, and generate a modulated signal. The modulated signal may be transmitted to one or more base stations through the antenna 911.

The digital section 920 may be implemented by one or more digital signal processors (DSPs), a microprocessor, and a reduced instruction set computer (RISC). Further, the digital section 920 may be fabricated on one or more application-specific integrated circuits (ASICs) or other types of integrated circuits (ICs).

The digital section 920 may include, for example, various processing and interface units, such as a modem processor 934, a video processor 922, an application processor 924, a display processor 928, a controller/multi-core processor 926, a central processing unit (CPU) 930, and an external bus interface (EBI) 932.

The video processor 922 may perform processing of graphic applications. In general, the video processor 922 may include a certain number of processing units or modules for a certain set of graphic operations. A specific part of the video processor 922 may be implemented by firmware and/or software. For example, a control unit may be implemented by firmware and/or software modules (e.g., procedures or functions) for performing the above-described functions. Firmware and/or software codes may be stored in a memory, or may be executed by a processor (e.g., the multi-core processor 926). The memory may be implemented in the processor or out of the processor.

The video processor 922 may implement a software interface, such as open graphic library (OpenGL) or Direct3D. The central processing unit 930 may perform a series of graphic processing operations together with the video processor 922. The controller/multi-core processor 926 may include at least two cores, and allocate work loads to two cores depending on the work loads, which the controller/multi-core processor 926 is to process, to process the corresponding work loads at the same time.

In FIG. 12, the application processor 924 is illustrated as one constituent element included in the digital section 920, but the present inventive concept is not limited thereto. In some exemplary embodiments of the present inventive concept, the digital section 920 may be implemented to be integrated into one application processor 924 or an application chip.

The modem processor 934 may perform necessary operations in a data transfer procedure between the digital section 920 and the receiver 913 or the transmitter 915. The display processor 928 may perform necessary operations to drive the display 910.

The semiconductor systems 1 to 5 according to the exemplary embodiments of the present inventive concept as described above may be used as cache memories or buffer memories used for operations of the processors 922, 924, 926, 928, 930, and 934 illustrated in FIG. 12.

Next, referring to FIG. 13, a computing system including at least one of the semiconductor systems 1 to 5 according to exemplary embodiments of the present inventive concept will be described.

Figure 13:
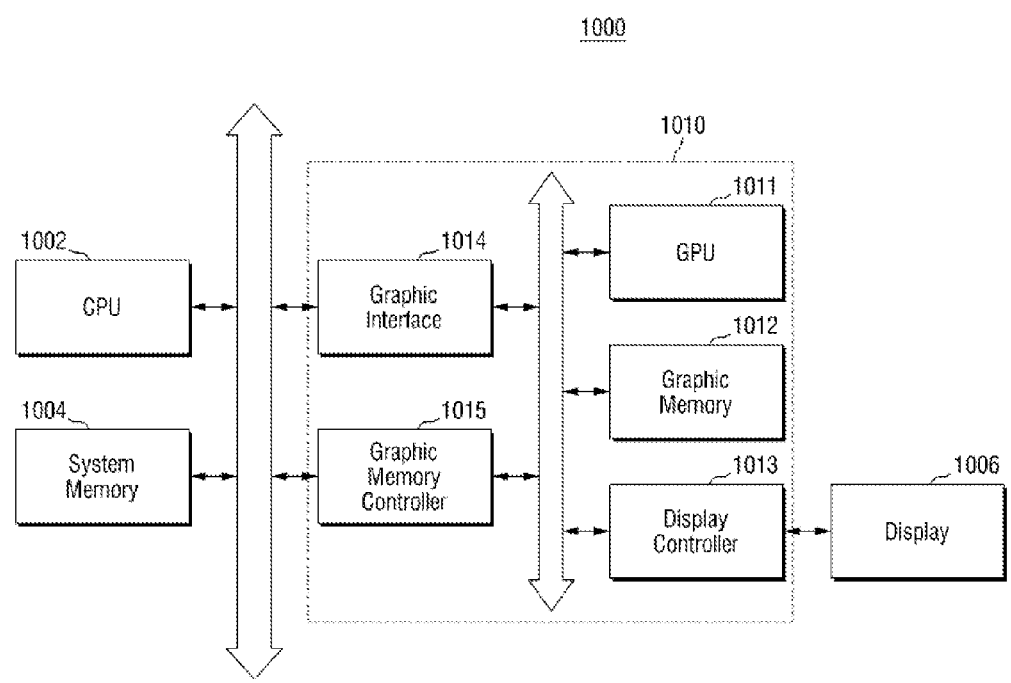
FIG. 13 is a block diagram of a SoC system including a semiconductor system according to exemplary embodiments of the present inventive concept.

FIG. 13 is a block diagram illustrating the computing system.

Referring to FIG. 13, the computing system 1000 according to an exemplary embodiment of the present inventive concept includes a central processing unit (CPU) 1002, a system memory 1004, a graphic system 1010, and a display 1006.

The central processing unit 1002 may perform operations required to drive the computing system 1000. The system memory 1004 may be configured to store data. The system memory 1004 may store data that is processed by the central processing unit 1002. The system memory 1004 may serve as an operating memory of the central processing unit 1002. The system memory 1004 may include one or more volatile memories, such as a DDR SDRAM (Double Data Rate Static DRAM), an SDR SDRAM (Single Data Rate SDRAM), and/or one or more nonvolatile memories, such as an EEPROM (Electrical Erasable Programmable ROM), and a flash memory. Memories 200 and 210, and the above-described registers and sub-registers, of any one of the semiconductor systems 1 to 5 according to the above-described exemplary embodiments may be adopted as constituent elements of the system memory 1004, the CPU 1002, and the graphic system 1010.

The graphic system 1010 may include a graphic processing unit (GPU) 1011, a graphic memory 1012, a display controller 1013, a graphic interface 1014, and a graphic memory controller 1015.

The graphic processing unit 1011 may perform graphic operations required for the computing system 1000. Specifically, the graphic processing unit 1011 may assemble primitives including at least one vertex, and perform rendering using assembled primitives.

The graphic memory 1012 may store graphic data that is processed by the graphic processing unit 1011 and provide graphic data to the graphic processing unit 1011. Further, the graphic memory 1012 may serve as an operating memory of the graphic processing unit 1011.

The display controller 1013 may control the display 1006 to display rendered image frames.

The graphic interface 1014 may perform interfacing between the central processing unit 1002 and the graphic processing unit 1011, and the graphic memory controller 1015 may provide a memory access between the system memory 1004 and the graphic processing unit 1011.

Although not illustrated in FIG. 13, the computing system 1000 may further include one or more input devices, such as buttons, a touch screen, and a microphone and/or one or more output devices, such as speakers. Further, the computing system 1000 may further include an interface device for exchanging data with an external device by wire or wirelessly. The interface device may include, for example, an antenna or a wire/wireless transceiver.

According to exemplary embodiments, the computing system 1000 may be a certain computing system, such as a mobile phone, a smart phone, a personal digital assistant (PDA), a desktop computer, a notebook computer, or a tablet.

Any one of the semiconductor systems 1 to 5 according to the above-described exemplary embodiments may be adopted as a constituent element of the computing system 1000.

Next, referring to FIG. 14, an electronic system including at least one of the semiconductor systems 1 to 5 according to exemplary embodiments of the present inventive concept will be described.

Figure 14:
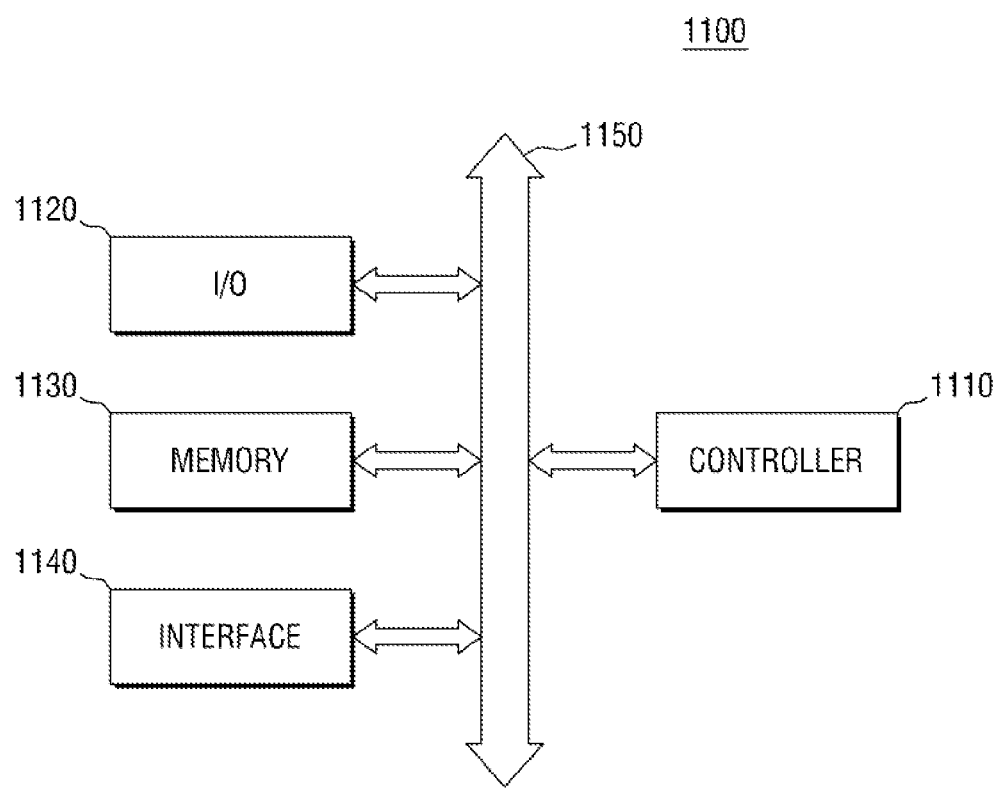
FIG. 14 is a block diagram of an electronic system including a semiconductor system according to exemplary embodiments of the present inventive concept.

FIG. 14 is a block diagram of the electronic system.

Referring to FIG. 14, the electronic system 1100 according to an exemplary embodiment of the present inventive concept may include a controller 1110, an input/output (I/O) device 1120, a memory 1130, an interface 1140, and a bus 1150. The controller 1110, the I/O device 1120, the memory 1130, and/or the interface 1140 may be coupled to one another through the bus 1150. The bus 1150 corresponds to paths through which data is transferred.

The controller 1110 may include at least one of a microprocessor, a digital signal processor, a microcontroller, and logic elements that can perform similar functions. The I/O device 1120 may include a keypad, a touchpad, a keyboard, and a display device. The memory 1130 may store data and/or commands. The interface 1140 may function to transfer the data to a communication network or receive the data from the communication network. The interface 1140 may be of a wired or wireless type. For example, the interface 1140 may include an antenna or a wire/wireless transceiver.

Although not illustrated, the electronic system 1100 may further include a high-speed DRAM and/or SRAM as an operating memory for supporting the operation of the controller 1110. In this case any one of the memory systems in the semiconductor systems 1 to 5 according to the above-described exemplary embodiments of the present inventive concept may be adopted as the memory 1130 and/or as a part of the controller 1110 or the I/O device 1120.

The electronic system 1100 may be applied to a PDA (Personal Digital Assistant), a portable computer, a web tablet, a wireless phone, a mobile phone, a digital music player, a memory card, or any other electronic device that can transmit and/or receive information in wireless environments.

Figure 15:
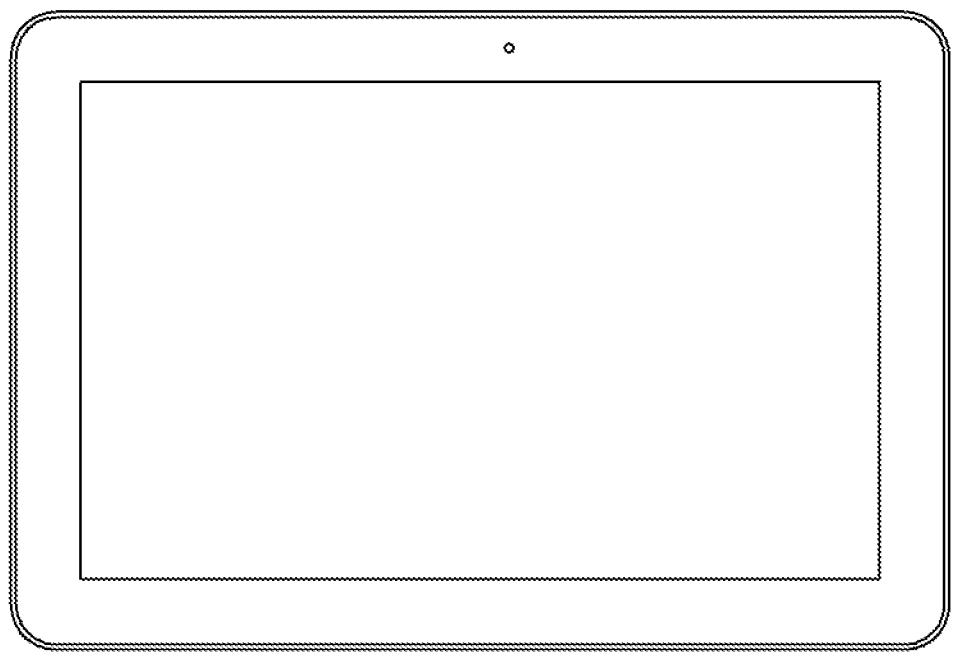
FIGS. 15 to 17 are views of exemplary semiconductor systems to which a semiconductor system according to some exemplary embodiments of the present inventive concept can be applied.
Figure 16:
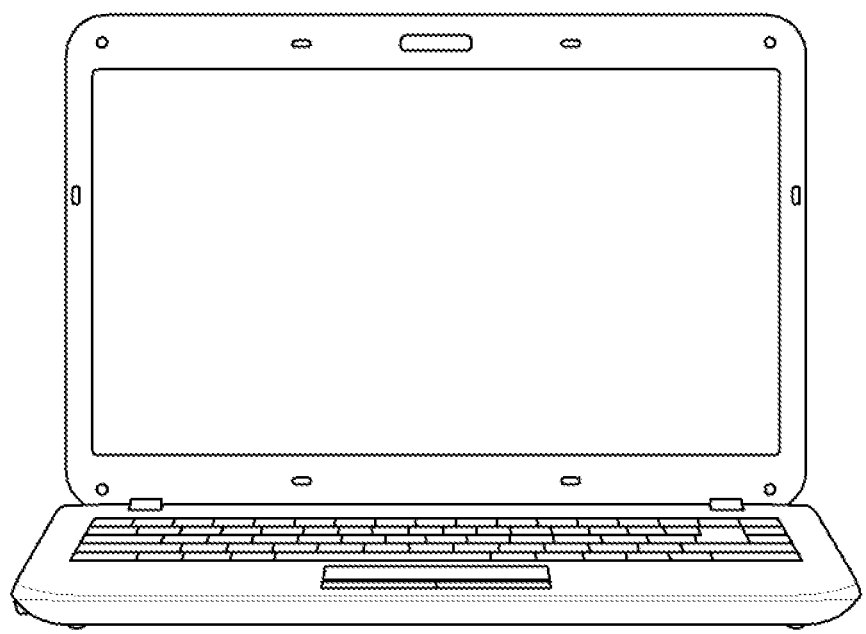
Figure 17:
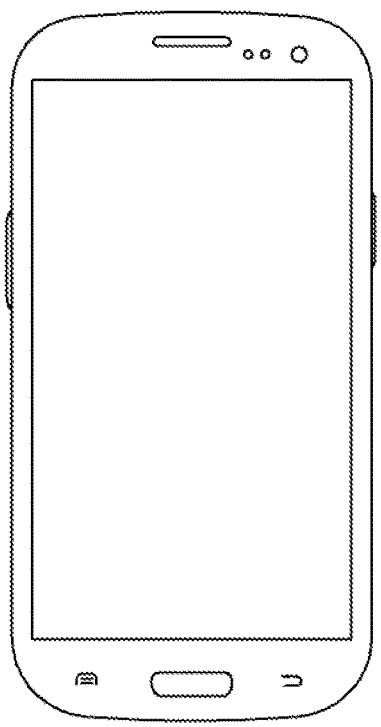

FIGS. 15 to 17 are views of exemplary semiconductor systems to which the semiconductor device according to some exemplary embodiments of the present inventive concept can be applied.

FIG. 15 illustrates a tablet PC 1200, FIG. 16 illustrates a notebook computer 1300, and FIG. 17 illustrates a smart phone 1400. At least one of the semiconductor systems 1 to 5 according to the exemplary embodiments of the present inventive concept may be used in the tablet PC 1200, the notebook computer 1300, or the smart phone 1400.

Further, it is apparent to those of skill in the art that the semiconductor device according to some exemplary embodiments of the present inventive concept can be applied even to other integrated circuit devices that have not been exemplified. That is, although the tablet PC 1200, the notebook computer 1300, and the smart phone 1400 have been indicated as examples of the semiconductor system according to exemplary embodiments, the examples of the semiconductor system according to exemplary embodiments are not limited thereto. In some exemplary embodiments of the present inventive concept, the semiconductor system may be implemented as a computer, UMPC (Ultra Mobile PC), workstation, net-book, PDA (Personal Digital Assistant), portable computer, wireless phone, mobile phone, e-book, PMP (Portable Multimedia Player), portable game machine, navigation device, black box, digital camera, 3D television set, digital audio recorder, digital audio player, digital picture recorder, digital picture player, digital video recorder, or digital video player.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present exemplary embodiments be considered in all respects as illustrative and not restrictive, reference being made to the appended claims rather than the foregoing description to indicate the scope of the invention.

What is claimed is:

1. A semiconductor system comprising:
    a processor including a first register configured to store a first register value and a second register configured to store a second register value;
    a memory configured to store a third register value that is a copy of the first register value and to store a fourth register value that is a copy of the second register value;
    a semiconductor device of which an operation is controlled by the processor;
    a bus that interconnects the processor, memory, and semiconductor device; and
    an operating system configured to change at least one of the third register value and the fourth register value stored in the memory,
    wherein the bus is configured to transmit changed third and fourth register values to be stored in the first and second registers, respectively, and
    wherein an operation of the processor is controlled by the third register value, and the operation of the semiconductor device is controlled by the fourth register value.

2. The semiconductor system of claim 1, wherein the operating system is configured to optimize at least one of an input and an output of the processor and the semiconductor device through changing the third register value and the fourth register value, respectively.

3. The semiconductor system of claim 1, wherein the operating system is unable to directly access the semiconductor device.

4. The semiconductor system of claim 1, wherein the memory comprises a portable memory that is detachably attached to the semiconductor system.

5. The semiconductor system of claim 1, wherein the semiconductor device comprises a power control circuit, a memory card, or a communication device.

6. The semiconductor system of claim 1, wherein the second register value includes a data address and a setting value for controlling an output signal of the semiconductor device.

7. The semiconductor system of claim 6, wherein the second register value includes control of at least one of an output power, an output frequency, drive strength, a current level, and a clock phase value of the semiconductor device.

8. The semiconductor system of claim 1, wherein the semiconductor device comprises a first sub-semiconductor device and a second sub-semiconductor device,
    wherein the second register value comprises a first sub-register value, configured to control an operation of the first sub-semiconductor device, and a second sub-register value, configured to control an operation of the second sub-semiconductor device,
    wherein the fourth register value comprises a third sub-register value and a fourth sub-register value, and
    wherein the bus is configured to map changed third and fourth sub-register values onto the first and second sub-register values, respectively.

9. The semiconductor system of claim 8, further comprising an operating system configured to change the third register value, the third sub-register value, and the fourth sub-register value,
- wherein changes to at least one of the first sub-register value by the processor and the third sub-register value by the operating system cause a change to at least one of an input and output of the first sub-semiconductor device, and
- wherein changes to at least one of the second sub-register value by the processor and the fourth sub-register value by the operating system cause a change to at least one of an input and output of the second sub-semiconductor device.

10. The semiconductor system of claim 1,
- wherein the processor is embodied by at least a first semiconductor chip, the memory is embodied by at least a second semiconductor chip and the semiconductor device is embodied by at least a third semiconductor chip, wherein the first semiconductor chip, the second semiconductor chip and the third semiconductor chip are each connected to the bus.

11. A semiconductor system comprising:
- a processor which includes a first register value and of which an operation is controlled by the first register value;
- a semiconductor device which includes a second register value and of which an operation is controlled by the second register value;
- a memory configured to store a third register value that is a copy of the first register value and to store a fourth register value that is a copy of the second register value; and
- an operating system configured to change the third register value and the fourth register value stored in the memory,
- wherein changes to the stored third and fourth register values are mapped onto the first register value of the processor and the second register value of the semiconductor device, respectively.

12. The semiconductor system of claim 11, wherein the operating system optimizes at least one of an input and an output of the processor through changing the third register value.

13. The semiconductor system of claim 11, wherein the operating system is configured to control an output of the semiconductor device through changing the fourth register value and wherein the operating system cannot directly access the semiconductor device.

14. The semiconductor system of claim 11, wherein the memory is configured to change operations of the processor and the semiconductor device simultaneously.

15. The semiconductor system of claim 11, wherein the semiconductor device further comprises a first sub-semiconductor device and a second sub-semiconductor device,
- wherein the first sub-semiconductor device includes a first sub-register value for controlling an operation of the first sub-semiconductor device,
- wherein the second sub-semiconductor device includes a second sub-register value for controlling an operation of the second sub-semiconductor device,
- wherein the fourth register value comprises a third sub-register value and a fourth sub-register value, and
- wherein changes to the first and second sub-register values by the processor are copied into the third sub-register value and the fourth sub-register value,
- wherein changes to the third sub-register value and the fourth sub-register value are mapped onto the first and second sub-register values of the processor.

16. The semiconductor system of claim 11, further comprising a bus,
- wherein the processor is embodied by at least a first semiconductor chip, the semiconductor device is embodied by at least a second semiconductor chip and the memory is embodied by at least a third semiconductor chip, wherein the first semiconductor chip, the second semiconductor chip and the third semiconductor chip are each connected to the bus.

17. A semiconductor system comprising:
- a bus;
- an application processor (AP) including a first register configured to store a first register value and connected to the bus;
- a first hardware device including a second register configured to store a second register value and connected to the bus;
- a memory connected to the bus, the memory configured to store a third value; and
- an operating system (OS) configured to change the third value stored in the memory to affect a corresponding change in the first register value stored in the first register,
- wherein the AP is configured to change the second register value stored in the second register in response to a change of the first register value stored in the first register, and
- wherein the second register is configured to adjust at least one of an output power, an output frequency, a drive strength, a current level and a clock phase value of the first hardware device,
- wherein the bus is configured to transmit changed first and second register values to be stored in the first and second registers, respectively, and
- wherein the first register is mapped to the memory so that a change in the value stored in one of the first register and memory causes a corresponding change in the value stored in the other of the first register and memory.

18. The semiconductor system of claim 17, wherein the AP is configured to copy the value stored in the first register to the memory upon bootup of the semiconductor system.

19. The semiconductor system of claim 17, wherein the first register is configured to store a data address and an operational value and wherein the AP is configured to store the operational value in the second register that is identified by the data address.

20. The semiconductor system of claim 17,
- wherein the application processor is embodied by at least a first semiconductor chip, the first hardware device is embodied by at least a second semiconductor chip and the memory is embodied by at least a third semiconductor chip, wherein the first semiconductor chip, the second semiconductor chip and the third semiconductor chip are each connected to the bus.

21. The semiconductor system of claim 17, wherein the OS is unable to directly access the first hardware device.

* * * * *